(No Model.)
G. B. HAINES.
POTATO PEELER.
No. 423,150. Patented Mar. 11, 1890.
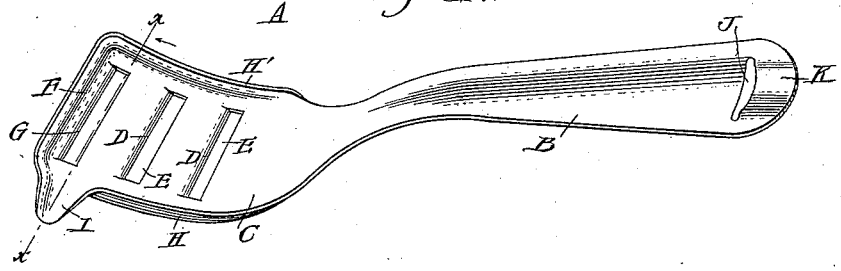
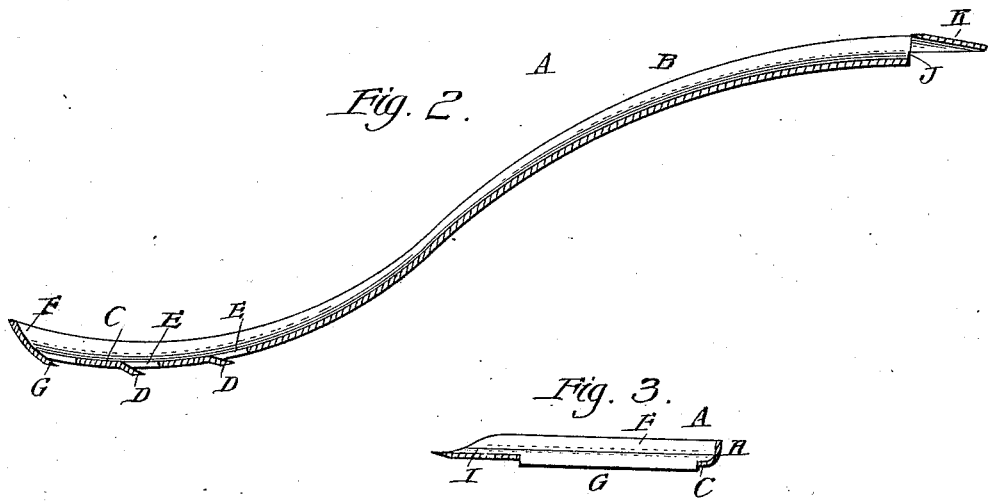
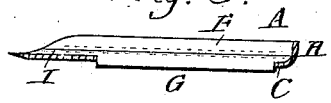
WITNESSES:
J. H. Clark.
C. Sedgwick.
INVENTOR:
G. B. Haines
BY
Munn & Co.
ATTORNEYS

UNITED STATES PATENT OFFICE.

GEORGE B. HAINES, OF NEW YORK, N. Y.

POTATO-PEELER.

SPECIFICATION forming part of Letters Patent No. 423,150, dated March 11, 1890.

Application filed September 13, 1889. Serial No. 323,817. (No model.)

*To all whom it may concern:*

Be it known that I, GEORGE B. HAINES, of the city, county, and State of New York, have invented a new and Improved Potato-Peeler, of which the following is a full, clear, and exact description.

The object of the invention is to provide a new and improved tool specially adapted for rapidly and conveniently peeling potatoes, apples, and like vegetables and fruits.

The invention consists of a curved frame provided with a series of knives arranged on the under side of the said plates and one in front of the other.

The invention also consists of certain parts and details and combinations of the same, as will be hereinafter fully described, and then pointed out in the claims.

Reference is to be had to the accompanying drawings, forming a part of this specification, in which similar letters of reference indicate corresponding parts in all the figures.

Figure 1 is a perspective view of the improvement. Fig. 2 is an enlarged sectional side elevation of the same, and Fig. 3 is a transverse section of the same on the lines *x x* of Fig. 1.

The improved potato-peeler A is preferably made of a single piece of sheet-steel pressed or stamped to the desired shape and ground at several places on an emery or other wheel to form the knives.

The potato-peeler A is provided with a handle B, curved to a desired shape to conveniently hold the peeler in the hand while using the same. On one end of the handle is formed the cutting-plate C, preferably curved to the form of a segment of a circle and having a series of transversely-extending knife-blades D projecting with their cutting-edges below the under surface of the plate C. As the blades D are stamped or pressed out of the plate C, they form in the latter and in front of their cutting-edges the transverse openings E, through which the peels pass upward onto the top of the plate C. After the blank knives are stamped and pressed downward they are sharpened by grinding the lower end on a grinding-wheel until the ground surface is parallel with the under surface of the plate C, as plainly shown in Fig. 2. The end F of the plate C is bent upward and outward, so that the knife G at the bottom of the said end F can conveniently pass into crevices of the article to be peeled. The sides H and H' of the plate C are bent upward and join the end F, so as to give the plate C a disk-like appearance and to more readily retain the peels. Part of the side H near the end F is bent outward to form a curved coring-knife I, rounded or pointed at its cutting-edge and serving to remove the cores of fruits or the eyes of potatoes, &c. The outer end of the handle B is provided with a transversely-extending slit J, and the end K of the handle is bent upward in an opposite direction to the handle-body to form a knife for slicing potatoes, &c., into strips.

The instrument is used as follows: The operator takes hold of the handle B with his right hand and takes the vegetable or fruit to be peeled in his other hand, and then he strikes over the surface of the vegetable or fruit with the knife-blades D, so that their cutting-edges take off the skin, which passes in through the openings E onto the top of the plate C, from which it can be removed by turning the peeler upside down. In order to get into small corners or crevices of the vegetable or fruit, the operator uses the front knife-blade G transversely, so as to conveniently take off the skin. The eyes in the potatoes or cores in fruit are easily removed by using the corer I, which permits the operator to dig out the eyes or cores and remove them by slightly turning the peeler. It will be seen that as the knives D project but a slight distance below the under side of the plate C only a thin peel is taken off the potato when the tool is used. Thus it will be seen that the tool is adapted for very rapidly and conveniently removing the skin of potatoes, apples, and like vegetables and fruits, and of effecting a great saving in the waste in the usual manner of peeling with a knife.

Having thus fully described my invention, I claim as new and desire to secure by Letters Patent—

1. A potato-peeler comprising a segmental plate having its end bent upward and provided with a series of transverse openings and with knife-blades on its under side at the said openings, one of the said knives being on the lower edge of the bent-up end of the plate, substantially as shown and described.

2. A potato-peeler comprising a segmental plate provided with transversely-extending openings and knives projecting with their cutting-edges below the under side of the said plate at the said openings, and a corer formed on one of the sides of the plate and projecting from the same, substantially as shown and described.

3. A potato-peeler comprising a segmental plate having its end bent upward and provided with a series of transverse openings, knife-blades on its under side at the said openings, one of the knives being on the lower edge of the bent-up end of the plate, and a corer projecting from one side of the plate, substantially as herein shown and described.

4. A potato-peeler having a curved handle provided with a transversely-extending slit and having its end beyond the slit curved in an opposite direction to the body of the handle to form a slicing-knife, substantially as and for the purpose set forth.

5. As a new article of manufacture, a potato peeler and slicer consisting of a curved plate having a series of transverse openings, a series of knife-blades on its under side at the said openings, and a corer projecting from one side and provided with a curved handle formed with a slicing-knife near its end, as specified.

GEORGE B. HAINES.

Witnesses:
   THEO. G. HOSTER,
   C. SEDGWICK.